Figure 1:
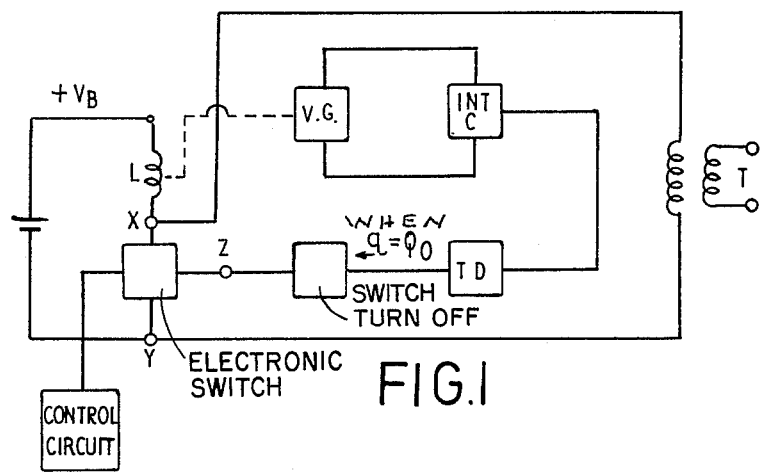

United States Patent [19]

Hudson

[11] 3,889,651

[45] June 17, 1975

[54] ENERGY METERING CIRCUITS FOR CAPACITOR DISCHARGE AND OTHER IGNITION SYSTEMS

[76] Inventor: George Hudson, 1 Harbour Gate, 10 Wolseley Rd., Point Piper, New South Wales, Australia

[22] Filed: Feb. 5, 1974

[21] Appl. No.: 439,840

[30] Foreign Application Priority Data
Feb. 7, 1973 Australia.............................. 2165/73

[52] U.S. Cl............................ 123/148 E; 315/209
[51] Int. Cl.............................................. F02p 3/02
[58] Field of Search ..................... 123/148 C, 148 E

[56] References Cited
UNITED STATES PATENTS
3,169,212  2/1965  Walters........................... 123/148 C
3,563,219  2/1971  Mieras............................ 123/148 E Primary Examiner—Manuel A. Antonakas
Assistant Examiner—Joseph Cangelosi
Attorney, Agent, or Firm—Wenderoth, Lind & Ponack

[57] ABSTRACT

An energy metering circuit for capacitor discharge and other ignition systems for accurately metering and delivering a predetermined amount of energy to produce an ignition spark on the production of a suitable trigger signal from an engine with which the system is associated. Energy is accumulated in an inductor which is connected to a battery for this purpose, the amount of energy accumulated in the inductor is sensed by means consisting of a voltage generator providing a terminal voltage $nV_L$ while the inductor is connected to the battery, $V_L$ being the instantaneous terminal voltage of the inductor, the output of the voltage generator being fed to an integrating circuit the output of which is a repeatable continuous single valued measure of $\int t_o V_L \, dt$ where $t$ is the time elapsed since connection of the inductor to the battery. A threshold detector is provided which responds to the output of the integrating circuit and produces an output when the output of the integrating circuit has reached the threshold of the threshold detector which it is arranged to do at the same time as the energy in the inductor has reached a desired value. The threshold detector then produces a signal to disconnect the conductor from the battery and to release the energy from the conductor either to produce a spark or to a capacitor for temporary storage and subsequent release.

2 Claims, 7 Drawing Figures

ENERGY METERING CIRCUITS FOR CAPACITOR DISCHARGE AND OTHER IGNITION SYSTEMS

The present invention relates to energy metering circuits for capacitor discharge and other ignition systems, the object of the invention being to provide metering circuits that are accurate, efficient and readily adjustable.

There are several reasons why an automotive or marine electronic ignition system should be encapsulated in an epoxy pack. Such a pack protects the components against ill-advised tinkering, damage from moisture, oil or dirt, and interconnection failures through vibration and metallic fatigue. Heat too, adversely affects component reliability, and in order to restrict the heat emission within the pack to a minimum the circuitry efficiency should be a maximum.

Electronic circuits using the well known capacitive discharge process for pulsing energy into a HT voltage transformer have great merit if properly designed, however; when the storage, or "dump" capacitor is recharged by a multiplicity of small pulses by means of an oscillating DC/DC converter heat dissipation is considerable because the low load efficiency is small and the energy delivered to the capacitor decreases as the load on the DC/DC converter increases.

The design department and the production department can both exploit the usefulness of a simple adjustment which provides a wide control over the amount of energy to be stored temporarily in an electronic ignition system. The designers can standardise their power inductors, capacitors etc., yet use them in models with widely differing output requirements. The production and control departments are not obliged to use expensive close-tolerance components, yet they can count on meeting the specification of the finished product.

Upon receipt of a suitable trigger-signal demanding a spark an ideal solid-state ignition system, say with a 12 volts battery supply, would immediately provide a specific measured amount of energy as a short pulse to an HT transformer in which it is instantly stepped up to spark-producing voltages. The quantum of energy, $W_o$, should be provided independently of ambient temperatures between −20°C and to at least +90°C and of engine speeds from cranking to maximum rpm, for which battery voltages between 6v. and 15v. can be anticipated. The system should be highly efficient electrically, and, preferably, the magnitude of $W_o$ should be easily adjusted merely by altering the component value of, say, a resistor.

Intuitively, one is led to believe that the most efficient circuitry to meet all these requirements is one which can be left permanently across the terminals of the battery from which no energy whatsoever is taken except in a single surge to produce $W_o$ in response to each trigger signal. This means that for each trigger signal one surge of energy is taken from the battery to provide the energy for one spark and since the optimum rate of energy release to the spark is too great to be supplied directly from the battery, the battery energy must be temporarily accumulated in a circuit capable of a much higher rate of release.

CLASS 1 SYSTEMS

If a delay of approx. 150 μ sec. from receipt of a signal until occurence of the spark is acceptable it is possible to complete the temporary storage process so quickly that this energy can be released in time to produce the spark just demanded. Those using this principle will be defined herein as Class 1 Systems.

CLASS 2 SYSTEMS

Alternatively, the temporary storage process may be done more leisurely in two parts. Following the trigger signal the energy surge from the battery is first accumulated to a magnitude of $W_o$ in a magnetic circuit and then delivered to a storage, or dump capacitor whence its release awaits the trigger signal for the next spark. Those using this principle will be defined herein as Class 2 Systems. This version of the Capacitor Discharge System is far more efficient than the oscillating DC/DC converter version.

The accumulation of a predetermined amount of energy, $W_o$, from the battery in a single surge is much to be preferred in both the Class 1 and Class 2 Systems just described and the accumulation and metering of this energy is the prime subject matter of the present invention. It should however be understood that a practical arrangement could be constructed in which the energy was accumulated in two or more surges.

ENERGY METERING

In an ignition system current is caused to flow and energy is stored in an inductor connected to a power supply by a control switch, so long as the control switch remains closed. A metering circuit is provided to open the control switch when the accumulated energy has attained a predetermined value, $W_o$, even when there are substantial changes in the power supply and in the ambient temperature. Energy metering is normally done by sensing the current flow in the main storage inductor, or by relying on this inductor or a subsidiary inductor to saturate. To allow the main inductor to saturate is usually extremely wasteful of energy and it has other disadvantages; in particular, for metering, it lacks ease of adjustment which must be done by changing the number of turns. This feature of lack of adjustability is shared by a subsidiary saturating inductor. The current sensing technique usually relies on sensing the current, or some function thereof, in the main inductor by sensing the voltage generated across a resistor. Voltage detection is normally done by the base-emitter junction of silicon transistors and since ignition systems are subject to extreme temperature changes a temperature compensating network is required to give satisfactory metering results. Certain classes of control switch require fairly substantial amounts of energy to be expended on them to effect their turn-off, so that the output from the sensing transistor may need further amplification.

It is the general principle of this invention that energy is accumulated in an inductor, the core of which is not permitted to saturate, by applying a battery voltage across said inductor by the closure of a switch, hereinafter called electronic Switch. This switch is maintained conducting until a predetermined amount of energy, $W_o$, has been accumulated in said inductor, the occurence of which is detected by means of an energy metering circuit, which, in turn, turns off the XYZ Switch thereby stopping the further accumulation of energy in the inductor.

Upon the opening of the XYZ Switch the energy accumulated in the inductor is released either directly to produce a sparking voltage (Class 1 Systems), or into another storage element where it remains until released to provide a sparking voltage at a later time (Class 2

Systems). An XYZ Switch is defined as a switch which provides a low impedance electrically conductive path between terminals X and Y upon application of any appropriate control signal. The control signal may utilise any physical phenomena appropriate to effect the impedance change in the XYZ Switch. It may, for example, but not exclusively, be an electrical signal applied between terminals Z and Y, or applied between two terminals Z and Z' which are electrically isolated from terminals X and Y, said control signal being either of a transient pulse nature or a continuous signal as dictated by the nature of the electronic Switch. Should the electronic Switch be of a self-sustaining nature as used in specific embodiments of the invention described below, the control signals will normally be of a transient nature. The switch will present a high impedance between terminals X and Y when turned off, either by the cessation of the original signal or by application of an appropriate control signal, either transient or steady state. Many devices and circuit arrangements are known in the art which conform to the definition of an electronic Switch defined above and it is therefor not proposed to describe any one switch of this type in detail.

The present invention consists of an energy metering circuit for an ignition system comprising an inductor, L, and an electronic Switch as hereinbefore defined, together comprising an energy absorption circuit, a battery connected to said circuit by means such that closure of said electronic Switch by an appropriate control signal connects said inductor to said battery, an inductive energy metering circuit comprising a voltage generator, to provide a terminal voltage $nV_L$ for the duration of the closure of said electronic Switch where $n$ is a positive or a negative number and $V_L$ is the instantaneous terminal voltage of said inductor, L, an integrating circuit, the output, $q$, of which is a repeatable continuous single-valued measure of $$\int_0^t V_L \, dt$$

where $t$ is the time elapsed after closure of said XYZ Switch, a threshold detector capable of responding to the output of said integrating circuit and of producing an output signal whenever the output of the said integrating circuit has attained a chosen value, $Q_o$, the output signal from said threshold detector actuating a means to turn off said electronic Switch, means to open said electronic Switch when a selectable energy change, $W_o$, has occurred in said inductor, and means for releasing said accumulated energy after the opening of said electronic Switch. The accumulated energy may be released either to a step-up transformer for producing a spark (Class 1 Systems) or to a capacitor for temporary storage (Class 2 Systems) and subsequent release to a step-up transformer via another switch or via the electronic Switch when it next closes.

In a preferred form of the invention a circuit is made to sense some function of the $$\int_0^t V_L \, dt$$

where $V_L$ is the instantaneous terminal voltage of the storage inductor and $t$ is the elapsed time after the control switch has been closed, preferably with a voltage threshold detector which is relatively immune to temperature variations, and to terminate energy accumulation when this threshold detector has been activated. This threshold detector is preferably in the form of a Voltage Sensitive Switch, V.S.S. A V.S.S. is defined as a switch through which no load current can pass until a specific terminal voltage, $V_T$, across its voltage sensing terminals T and T' is exceeded, whereupon the internal impedance between the load-carrying terminals, A and A', switches from open-circuit to short-circuit, the impedance between T and T' being high at voltages below $V_T$ and preferably one for which $V_T$ is independent of temperature changes. A Silicon unilateral switch S.U.S. is a typical example. As a result the energy stored in the main inductor can be varied merely by changing the value of a resistor, and the energy stored in the integrating circuit can be used to turn off the control switch. Furthermore, by a suitable choice of parameters, it is possible to obtain extremely accurate energy metering over a wide range of battery voltage and ambient temperature variations, but, if so desired, it is also possible to automatically obtain more energy in the inductor when the battery voltage is low and yet to maintain good regulation over the normal operating battery range. The circuitry to be described is also capable of driving electric tachometers with great accuracy merely for the costs of the meter movement.

Before proceeding, some brief observations on the metering philosophy seem apt. Firstly, the metering circuit to be described does not sense current flow in L because $$\int_0^t V_L \, dt$$

is only a function of the change of energy in L, whereas current is a measure of the absolute energy in L.

Secondly, the output from the integrating circuit, i.e.

$$q = f\left( \int_0^t V_L \, dt \right)$$

provides a function-of-a-function of the change of energy in L so $Q_o$ may only be used for automatically terminating the energy process at some predetermined energy level providing there is no energy or always the same energy in the inductor when the electronic switch is closed. If, as is normal practise, the energy release circuit is arranged so that the electronic switch is never closed before all the energy from L has been released, then the $$\int_0^t V_L \, dt$$

is a measure of the absolute value of energy, this measure being related to the expression for $q$.

Figure 2:
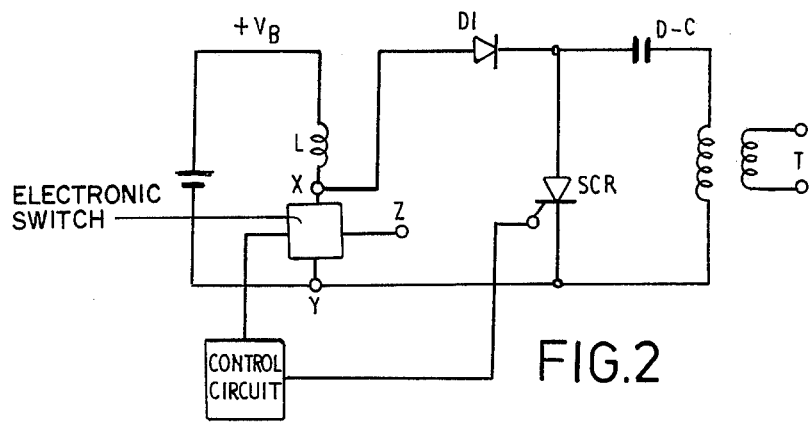
Figure 3:
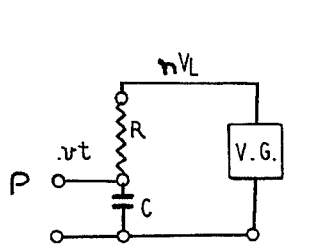
Figure 4:
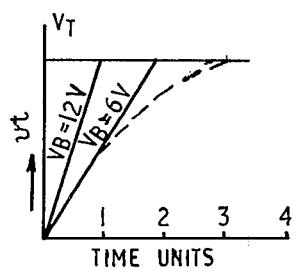
Figure 5:
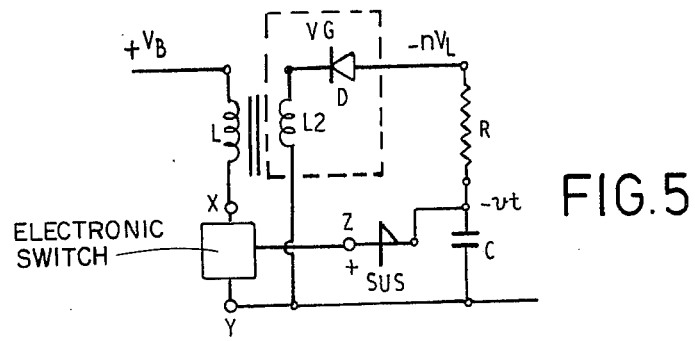
Figure 6:
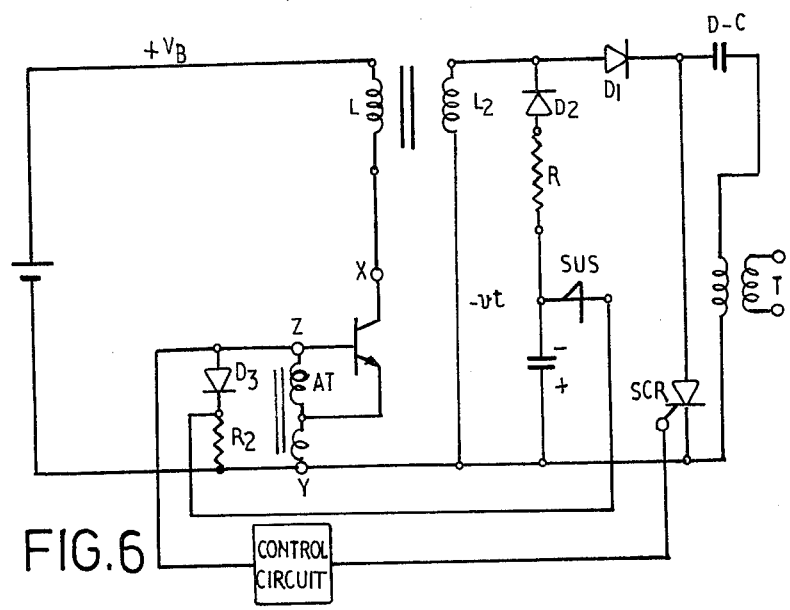
Figure 7:
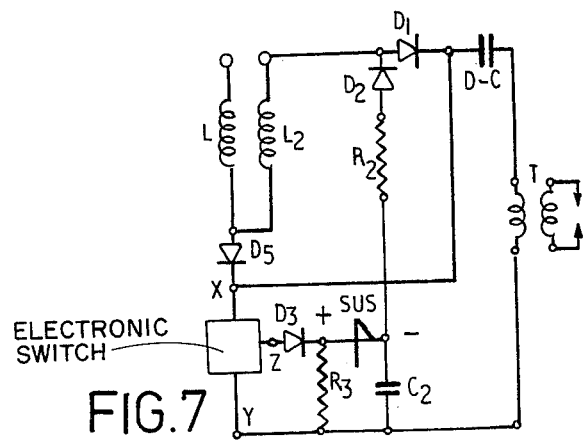

In order that the invention may be better understood and put into practise, preferred forms thereof are hereinafter described by way of example, with reference to the accompanying drawings in which:

FIG. 1 is a block diagram illustrating the manner in which the invention is applied in Class 1 Systems, FIG. 2 is a block diagram illustrating the manner in which inductive energy is released in Class 2 Systems, FIG. 3 shows an RC integrating circuit activated by a V.G., FIG. 4 illustrates how the RC integrating circuit can be used to increase the stored energy level automatically when the battery voltage is low, FIG. 5 depicts the workings of an RC integrating circuit in conjunction with a silicon unilateral switch used both as a threshold detector and as a means for turning off the electronic Switch, FIG. 6 depicts the circuitry of FIG. 5 in a working example, of Class 2 Systems in which the voltage generator and the energy release circuit make use of a common inductor. The electronic Switch has been rendered self-sustaining by using a regenerative auto current transformer, FIG. 7 shows a metering circuit for use in a case where the electronic switch performs the double function of controlling the energy in the storage inductor and also of releasing the energy stored in the dump capacitor in a Class 2 System.

FIG. 1 is a block diagram of the circuitry employing the nomenclature defined above and the functioning of the various elements are now described for Class 1 Systems. An appropriate control signal is applied from the control circuit, whenever a spark is required, to close the electronic switch at $t=0$ resulting in a current increase in L, which, after $t$ secs, has increased the stored energy therein by an amount $w$. Also, at $t=0$ the output voltage $nV_L$ from the voltage generator V.G., has been applied across the Integrating Circuit, Int. C., from which emerges some detectable form of energy, which after $t$ secs has a magnitude $$q = f\left( \int_0^t V_L \, dt \right),$$

and eventually this magnitude attains the value $Q_o$ to which the threshold detector TC responds. Thereafter the output from the Threshold Detector is applied to the the electronic switch turn-off circuit which, in turn, opens the electronic switch. Energy is now released from L to the primary of the step-up tranformer T which results in a sparking potential being produced across its secondary terminals. It is preferable that all the energy be released from L before the electronic switch is allowed to close again. By ensuring that when $q$ has attained the volume $Q_o$, $w = W_o$ release of the correct amount of energy is ensured.

Since the functioning of the metering circuit just described is identical in Class 2 Systems, FIG. 2 is merely given to describe the differences in the energy release circuits. FIG. 2 is a simple, but undesirable example of Class 2 circuitry. When the electronic switch is opened energy flows from L via diode $D_1$ to charge the dump-capacitor, D-C. D-C is prevented from discharging by $D_1$ and by a silicon controlled rectifier, SCR. The gate of the SCR is triggered to fire the SCR whenever a spark is required. This results in discharging D-C through the primary of the step-up transformer which produces a sparking potential across its secondary. It is usually convenient to arrange that the control signal circuit for turning on the electronic be caused also to fire the gate of the SCR.

The control circuit indicated in FIGS. 1, 2 and 6 is any circuit which on receipt of a command signal from an engine with which the ignition circuit is associated will produce a control signal appropriate to produce a response in the metering circuit to turn on the electronic switch and in a circuit such as that shown in FIG. 6 also to fire the gate of an SCR.

Specific examples of embodiments of the invention will now be given in some detail. The chosen threshold detector will be one responding to voltage and will be referred to as a Voltage Threshold Detector, V.T.D. The Threshold Voltage at which the detector responds will be called $V_T$. Accordingly, the output from the integrating circuit will be a voltage, $v_t$, corresponding to $q$, and $V_T$ corresponds with $Q_o$. The chosen integrating circuit will be a simple RC network energised by the voltage generator as shown in FIG. 3. The voltage across C can be made proportional to $$\int_0^t V_L \, dt$$

so that the output point from the integrating circuit is chosen as point P.

The functions of the Threshold Detector and the electronic switch turn-off circuit can be combined very suitably in certain types of voltage sensitive switches (V.S.S.) such as the Silicon Unilateral Switch, S.U.S. This particular switch is basically a two-terminal device which remains open circuit until a $V_T$ of about 8 volts is applied whereupon it approaches a short-circuit condition and remains in this state so long as the forward conducting current exceeds some small value. Another advantage of the S.U.S. is that $V_T$ is almost independent of temperature variations.

Classes of electronic switch require the extraction of energy from a gate to effect turn-off, for which purpose the energy stored in C can be put to use. If, in order to turn off the electronic switch the extraction of energy necessitates that the gate of the electronic switch be held at a potential lower than Y, this requirement can be satisfied by ensuring that C is charged in the appropriate direction by arranging for the polarity of the voltage generator to provide this condition.

A convenient voltage generator results from closely coupling another winding, $L_2$, to L in which event the turns ratio will determine $nV_L$. However, the terminal voltage polarity of L will reverse after L has ceased conducting, resulting in an output voltage from the generator of plus and minus $nV_L$ over the period of one cycle. A uni-polar output is then readily achieved by putting a diode in the appropriate direction in the output circuit of such a voltage generator. In some Class 2 circuits an additional winding on L is already called for as part of the energy release circuit; this winding, or a tap thereon provides a V.G. free of cost. For conditions where $n$ lies between 0 and +1 no additional winding is needed since L itself can perform the function of the voltage generator. Some of these observations are exploited in subsequent practical circuitry to be described.

Reverting to FIG. 3 the electronic switch is closed at $t = 0$ and $nV_L$ volts is applied to the RC integrating network. Neglecting for the moment the voltage excursion across C whilst it is charging, the charging current will be proportional to $nV_L$ and the voltage appearing across C, namely a ramp voltage, will be proportional to $$\int_0^t V_L \, dt$$

and hence related to the energy in the inductor. The slope of the ramp voltage can be adjusted by varying, say, the resistor to attain any chosen $V_T$ for any chosen change in the inductive energy.

The peak voltage attained by C is the threshold voltage $V_T$ of the V.T.D. and if $V_T/nV_L$ is not very small, the slope of the ramp voltage generated across C will decrease with time. However, this error can be intentionally exaggerated and put to advantage. The two straight lines in FIG. 4 show how $v_t$ would behave with a true ramp generator. $v_t$ takes twice as much time to reach $V_T$ (and so to turn off the XYZ) switch when $V_B$ = 6v. as it takes when $V_B$ = 12v. But $w$ also takes twice as much time to reach $W_o$, so $W_o$ will not vary with $V_B$ fluctuations. The non-linear effect (dotted line) results in allowing $w$ to increase for a longer time than it should for $V_B$ = 6v., so that $w$ will become greater than the design figure $W_o$. Hence, more energy for cold starts and low values of $V_B$ is generated. This non-linear effect is of no consequence at $V_B = 12 \pm 3V$. because then the factor $V_T/nV_L$ is about halved and also because $W_o$ would be adjusted and fixed with $V_B$ at 12.5v.

FIG. 5 shows a metering circuit suitable for use with an electronic Switch with the turn-off requirement that energy be extracted from Z by maintaining Z below the potential of Y. Gate Turn-off Switches are self-sustaining versions of this type of switch. $L_2$ (tightly coupled to L) and diode D constitute the V.G. for which $n$ is merely the turns-ratio. When the switch is on, $-nV_L$ appears across RC until the switch is turned off, since the inductive core does not saturate. The voltage difference across the S.U.S. is $V_Z + v_t$ and when this = $V_T$ the S.U.S. fires. This causes the electronic switch to turn-off and C to be re-set to a datum level in readiness for the next excursion. In practise $V_Z$ is negligible compared with $V_T$.

FIG. 6 shows a more complete circuit in which an electronic switch is used which calls for additional circuitry to reset C and in which $L_2$ is also used as part of the energy delivery circuit. The switch depicted is made to be self-sustaining by driving the transistor base regeneratively from the secondary of a closely coupled auto-current-transformer AT, the primary being fed with the collector current. On receipt of the control signal the electronic switch 1 shown as a transistor stays on during which time energy is stored in the inductors and $-nV_L$ volts are held across RC. Only the small, integrating circuit current flows through R and $L_2$ whilst C charges, since $D_1$ is back-biased. The control signal also fires the S.C.R. and discharges D-C so that a spark is generated a few micro-seconds later. When $V_T$ has been attained across the S.U.S. this switch fires and turns off the electronic switch, whereupon the polarity of ZY will reverse. Should Z go more negative than C the S.U.S. would turn off, leaving C partly charged, but $D_3$ circumvents this situation. C will complete its discharge via $R_2$. When the switch turns off the polarity of $L_2$ reverses and energy is delivered via $L_2$ and the forward biased $D_1$ into the empty D-C. The system is now in readiness for the next cycle.

FIG. 7 shows a metering circuit suitable for use in the case where the electronic switch performs the double function of controlling the energy in the storage inductor and also releases the energy stored in the dump capacitor D-C in a Class 2 System. The preferred type of electronic switch would be a gate turn-off switch of the type described in FIG. 6. When the switch is first turned on the charged dump capacitor will discharge and energise the step-up transformer in the normal way. At the same time a current will start to increase in L and this will be terminated by the metering circuit as described previously. $D_5$ prevents the dump capacitor from emptying back via L into the battery.

I claim:

1. An energy metering circuit for an ignition system comprising: an inductor; an electronic switch coupled to said inductor and forming therewith an energy absorption circuit; a battery connected to said energy absorption circuit and connected to said inductor when said electronic switch is closed and disconnected therefrom when said electronic switch is open; control means operatively coupled to said electronic switch for closure thereof; a voltage generator adapted to produce an output $nV_L$ for the duration of closure of said electronic switch, where $n$ is a positive or negative number and $V_L$ is the instantaneous terminal voltage generator and producing an output $q$, said output $q$ being a repeatable continuous single valued measure of $$\int_0^t V_L \, dt, \quad [q = S_0 V_L dt]$$

where $t$ is the elapsed time after closure of said electronic switch; a threshold detector coupled to the integrator and producing an output signal whenever the output $q$ of said integrating circuit attains a predetermined value $Q_0$; means coupled to said electronic switch and said threshold detector for turning off said electronic switch responsive to output from said threshold circuit; means operatively coupled to said electronic switch and to said inductor for opening said electronic switch when a selectable energy change $W_o$ occurs in said inductor; and means operatively coupled for releasing said accumulated energy after said switch is opened.

2. The energy metering circuit of claim 1 wherein said integrating circuit is comprised of a series combination of a resistor and a capacitor, said voltage threshold detector being comprised of a voltage sensitive switch adapted to interconnect said capacitor and said electronic switch when the output of said integrating circuit attains said predetermined value.

* * * * *